US010560457B2

(12) United States Patent
Anderson et al.

(10) Patent No.: US 10,560,457 B2
(45) Date of Patent: Feb. 11, 2020

(54) SYSTEMS AND METHODS FOR PRIVILEGED ACCESS MANAGEMENT (71) Applicant: American Express Travel Related Services Company, Inc., New York, NY (US)

(72) Inventors: Duc D. Anderson, Glendale, AZ (US); Chad A. Erbe, Glendale, AZ (US); Alex Jeffery Lundberg, Surprise, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 141 days.

(21) Appl. No.: 14/967,734

(22) Filed: Dec. 14, 2015

(65) Prior Publication Data

US 2017/0171214 A1 Jun. 15, 2017

(51) Int. Cl.
| *G06F 17/00* | (2019.01) |
| *H04L 29/06* | (2006.01) |
| *H04L 29/08* | (2006.01) |
| *G06F 16/27* | (2019.01) |
| *G06F 16/245* | (2019.01) |
| *G06F 16/22* | (2019.01) |
| *G06F 16/23* | (2019.01) |

(52) U.S. Cl.
CPC ........ *H04L 63/102* (2013.01); *G06F 16/2282* (2019.01); *G06F 16/2358* (2019.01); *G06F 16/245* (2019.01); *G06F 16/27* (2019.01); *H04L 63/105* (2013.01); *H04L 63/20* (2013.01); *H04L 67/1095* (2013.01)

(58) Field of Classification Search
CPC combination set(s) only.
See application file for complete search history.

(56) References Cited

U.S. PATENT DOCUMENTS

| 2004/0064691 | A1* | 4/2004 | Lu | H04L 9/3268 713/158 |
| 2007/0112864 | A1* | 5/2007 | Ben-Natan | G06F 17/30368 |
| 2008/0082540 | A1* | 4/2008 | Weissman | G06F 21/6227 |
| 2008/0201454 | A1* | 8/2008 | Soffer | H04L 41/00 709/220 |

(Continued)

OTHER PUBLICATIONS

"Kin Suntana Tep, Ben Martini, Ray Hung, Kim-Kwang Raymond Choo, A taxonomy of Cloud Attack Consequences and Mitigation Strategies: The Role of Access Control and Privileged Access Management, Aug. 20-22, 2015, IEEE, INSPEC# 15635739" (Year: 2015).*

(Continued)

*Primary Examiner* — Phy Anh T Vu
(74) *Attorney, Agent, or Firm* — Thomas | Horstemeyer, LLP (57) ABSTRACT A master database server may store policy tables which are replicated to SQL databases on a periodic schedule. A master server may receive a privileged command request from a user. The master server may query the SQL database to determine whether the user is authorized to execute the command request. The master server may determine whether the user is a member of a privileged request command ("PRC") group, whether the PRC group has access to the master server, and whether the PRC group has permission to execute the command request.

19 Claims, 4 Drawing Sheets

(56) References Cited

U.S. PATENT DOCUMENTS

| | | | | |
|---|---|---|---|---|
| 2010/0023523 A1* | 1/2010 | Chung | ................... | G06F 21/62 |
| | | | | 707/E17.005 |
| 2011/0162046 A1* | 6/2011 | Forster | ................... | G06F 21/41 |
| | | | | 726/4 |
| 2011/0231443 A1* | 9/2011 | Hannel | ................ | H04L 63/105 |
| | | | | 707/776 |
| 2011/0252459 A1* | 10/2011 | Walsh | .................... | G06F 21/33 |
| | | | | 726/4 |
| 2011/0258683 A1* | 10/2011 | Cicchitto | ............. | G06F 21/604 |
| | | | | 726/4 |
| 2012/0011567 A1* | 1/2012 | Cronk | .................. | H04L 63/102 |
| | | | | 726/4 |
| 2012/0331053 A1* | 12/2012 | Dunn | .................... | G06Q 50/01 |
| | | | | 709/204 |
| 2015/0278329 A1* | 10/2015 | Hrle | ....................... | G06F 16/27 |
| | | | | 707/615 |

OTHER PUBLICATIONS

Jianmin Zhang, Jian Li, Xiande Liu, An Efficient Key Management Scheme for Access Control in a User Hierarchy, Jul. 25-26, 2009, IEEE, INSPEC#10804835: (Year: 2009).*

"Wang Cheng, An Jia-hui, A permissions management model based on RBAC, May 27-29, 2011, IEEE, INSPEC# 12260275" (Year: 2011).*

* cited by examiner

SYSTEMS AND METHODS FOR PRIVILEGED ACCESS MANAGEMENT

FIELD

The present disclosure relates to information technology, and more particularly, to privileged access management.

BACKGROUND

Privileged access management refers to the administration of special requirements of powerful accounts within the IT structure of an enterprise. Privileged access management is often used to assist companies in complying with regulations, maintaining logs, and preventing internal data breaches through the use of privileged accounts. Many organizations utilize PowerBroker® for Unix/Linux ("PBUL") to support privileged access management on a UNIX server. PowerBroker® is a software program provided by BeyondTrust, Inc located at 5090 North 40th Street, Suite 400 Phoenix, Ariz. 85018. A privilege policy may define the access levels for different users. The users may be assigned to a group, and each group may have a different set of rules defining what commands the users may implement on different servers. For large organizations with thousands of servers and users, the policy can include millions of rows. As the policy grows beyond 3,000 rows, there can be a significant time lag of 90 seconds or longer to evaluate whether a command request is authorized, as the system may read through every line in the policy.

SUMMARY

Systems and method for controlling privileged access management may comprise creating a policy table on a master database server, replicating active permissions in the policy table to a SQL database on a periodic basis (wherein the replicating comprises overwriting a previous policy table on the SQL database), receiving a command request on a master server in response to the receiving the command request, querying the SQL database, and verifying a permission for the command request on the master server.

In various embodiments, the method may comprise receiving a policy change request. The policy change request may be approved through an approval chain. The policy change request may be stored in a policy change log. An active permission may comprise an active start time and an active end time. The command request may be received from a user. The method may comprise determining that the user is a member of a group, determining that the group has an active permission on the master server, determining that the group is authorized to execute the command request, executing the command request, logging the command request in a request log file, and/or logging the command request in a session log file.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Systems and methods for privileged access management are disclosed herein. A master database server may store policy tables which are fully or partially replicated to SQL databases. The replication may be on a periodic schedule (e.g., certain times, random, algorithmic, based on other factors or any other time frame). A master server may receive a privileged command request from a user. The master server may query the SQL database to determine whether the user is authorized to execute the command request. The master server may determine whether the user is a member of a privileged request command ("PRC") group, whether the PRC group has access to the master server, and/or whether the PRC group has permission to execute the command request.

Figure 1:
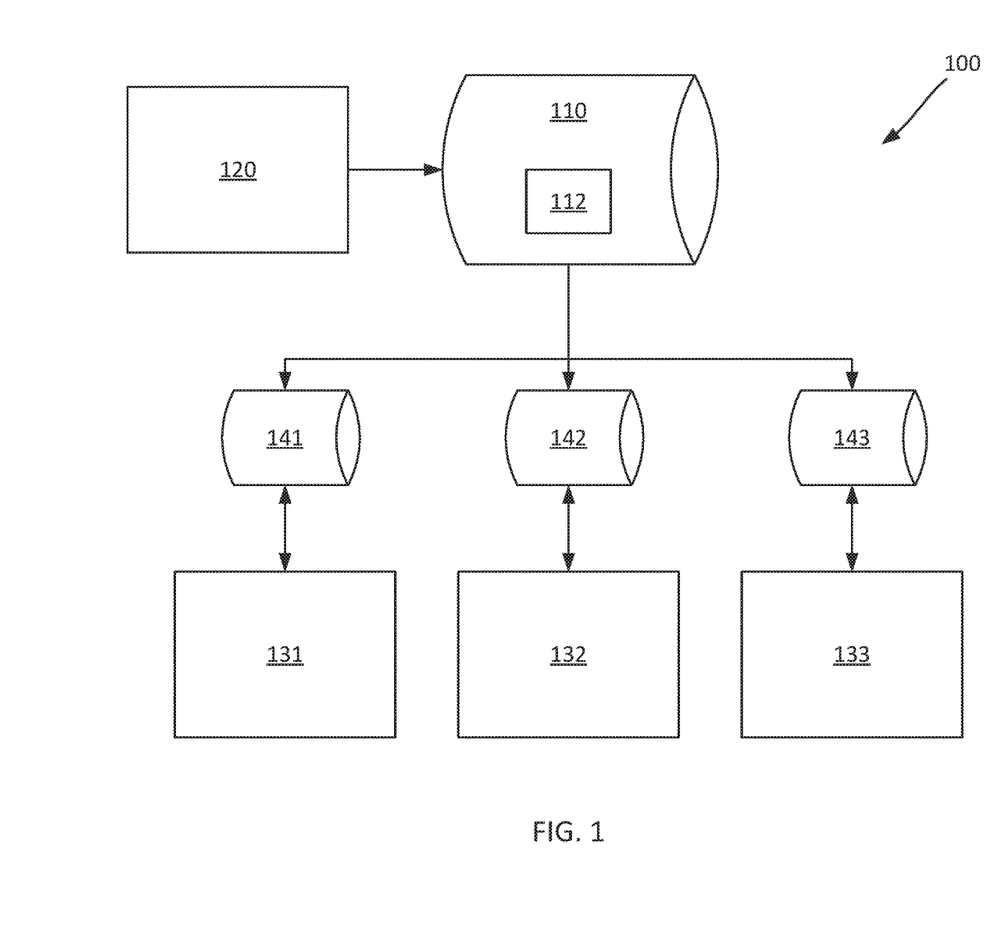
FIG. 1 illustrates a system for privileged access management, in accordance with various embodiments.

Referring to FIG. 1, a system 100 for privileged access management ("PAM") is illustrated according to various embodiments. The system may comprise a master database server 110. The master database server 110 may comprise a PowerBroker policy table 112. The PowerBroker policy table 112 may comprise the permissions for all users of the system 100. The users may be members of a privileged request command ("PRC") group. The PowerBroker policy table 112 may comprise tables listing the permissions for each PRC group. The system 100 may comprise a clustered SQL environment 120. The clustered SQL environment may be in communication with the master database server and may be used to make changes to the PowerBroker policy table 112 on the master database server 110.

The master database server 110 may replicate the PowerBroker policy table 121 to a plurality of SQL databases 141, 142, 143 on a periodic schedule. The replication may be a one-way replication, such that if changes are made to the SQL databases 141, 142, 143, the changes do not affect the master database server 110 or the PowerBroker policy table 112. The SQL databases 141, 142, 143 may be in communication with a plurality of master servers 131, 132, 133, such as a development environment server 131, disaster recovery server 132, and production environment server 133. The development environment server 131 may comprise test applications and webpages which are undergoing quality assurance. The production environment server 132 may comprise live webpages and applications. The active directory environment server 133 may comprise a hierarchical network directory service used for managing permissions and user access to network resources. In various embodiments, each master server may comprise a plurality of servers for redundancy.

In various embodiments, the PowerBroker policy table 112 may be replicated every 20 minutes, daily, randomly, algorithmic or on any other suitable schedule. Thus, if a change is made to the policy on the SQL databases 141, 142, 143, the master database server 110 may overwrite the policy on the SQL databases 141, 142, 143 periodically. Thus, if an undesired change is made to the policy on the SQL databases 141, 142, 143, the change will only be in effect until the next replication.

The PowerBroker policy table 112 may comprise a description of commands which users of PRC groups are able to execute. The PowerBroker policy table 112 may indicate that a user is permitted to fully or partially access or edit certain information on specified servers. Permissions in the PowerBroker policy table 112 may also comprise a temporal component, which permits a user to execute commands for a specified amount of time. A permission may comprise an active start time and an active end time. The temporary access may be activated at a specified active start time and automatically expire at the active end time. In various embodiments, the PowerBroker policy table 112 only fully or partially replicates the permissions which are active to the SQL databases 141, 142, 143. Thus, rather than the SQL databases 141, 142, 143 containing the complete policy, only the active permissions of the PowerBroker policy table 112 are fully or partially replicated to the SQL databases 141, 142, 143. In response to some or all of the active permissions expiring, and in response to the next replication taking place, the policy on the SQL databases 141, 142, 143 is fully or partially overwritten and some or all of the expired permissions are no longer present on the SQL databases 141, 142, 143. In the event of failure of the master database server 110, the policy tables on the SQL databases 141, 142, 143 may remain active until the master database server 110 is operable and fully or partially replicates the current active policy tables to the SQL databases 141, 142, 143.

Figure 2:
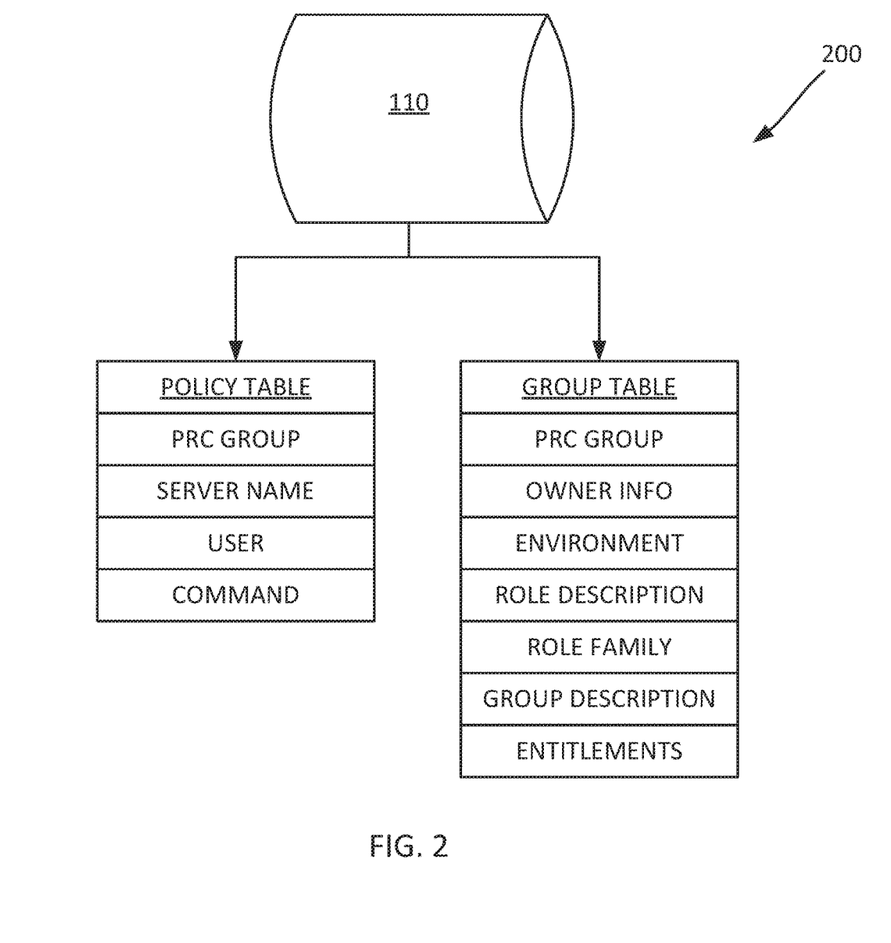
FIG. 2 illustrates a replication system, in accordance with various embodiments.

Referring to FIG. 2, a replication system 200 is illustrated according to various embodiments. At periodic intervals, the master database server 110 may replicate policy group information tables to the master servers. The tables may comprise a policy table 210 and a group table 220. The policy table 210 may comprise all or a subset of active permissions for the master server. The policy table 210 may comprise the PRC group, the server name, the user name, and/or the specific commands. The group table 220 may comprise some or all valid permissions for a PRC group. The group table may comprise the PRC group, owner info, environment, role description, role family, group description, and/or entitlements. In response to a master server receiving a command request from a user, the master server may query the policy table to verify that the user is authorized to execute some or all of the commands. In response to a request for information of commands a user is authorized to execute, the master server may query the group table and provide a list of all or a subset of active permissions for the user or the PRC group.

Figure 3:
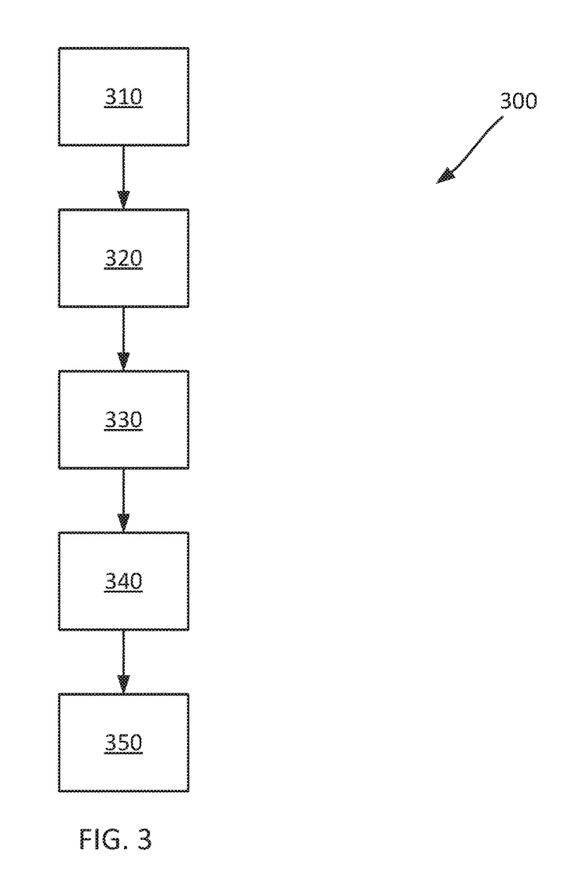
FIG. 3 illustrates a flowchart of a process for authorizing a policy change request, in accordance with various embodiments.

Referring to FIG. 3, a flowchart 300 of a process for making a policy change is illustrated, according to various embodiments. A user may request a change to the policy (step 310). For example, a user may request access to execute commands on a particular server. The request may include an identification of the server, the identification of the command, the duration of access, and/or the purpose for requesting access. The user may be a member of a group. A group owner may review the request and approve or reject the request and the duration of access (step 320). If the group owner approves the request, an information security team member may review the request. The information security team member may review the commands, identify stakeholders (e.g., server owners, database administrators, etc.) and the information security team member may approve or reject the request based on security aspects of the commands requested (step 330). If the information security team member approves the request, the request may be reviewed by a stakeholder, such as the server owner or database administrator. The stakeholder may approve or reject the request based on factors such as role, duration, and/or necessity of the request (step 340). If the request is rejected at any level, a notification with reason for rejection may be sent to all previous approvers. If the request is approved, the policy may be updated (step 350). Each request, approval, rejection, and/or policy change may be recorded in a policy change log. Thus, policy changes may be easily audited, if desired. The policy change log may provide a complete listing of all changes that were made or requested, including the time and date, person requesting the change, type of change, etc. In various embodiments, each policy change may expire if not used for a specified period of time, such as 90 days. This may prevent undesired access from being granted in perpetuity.

Figure 4:
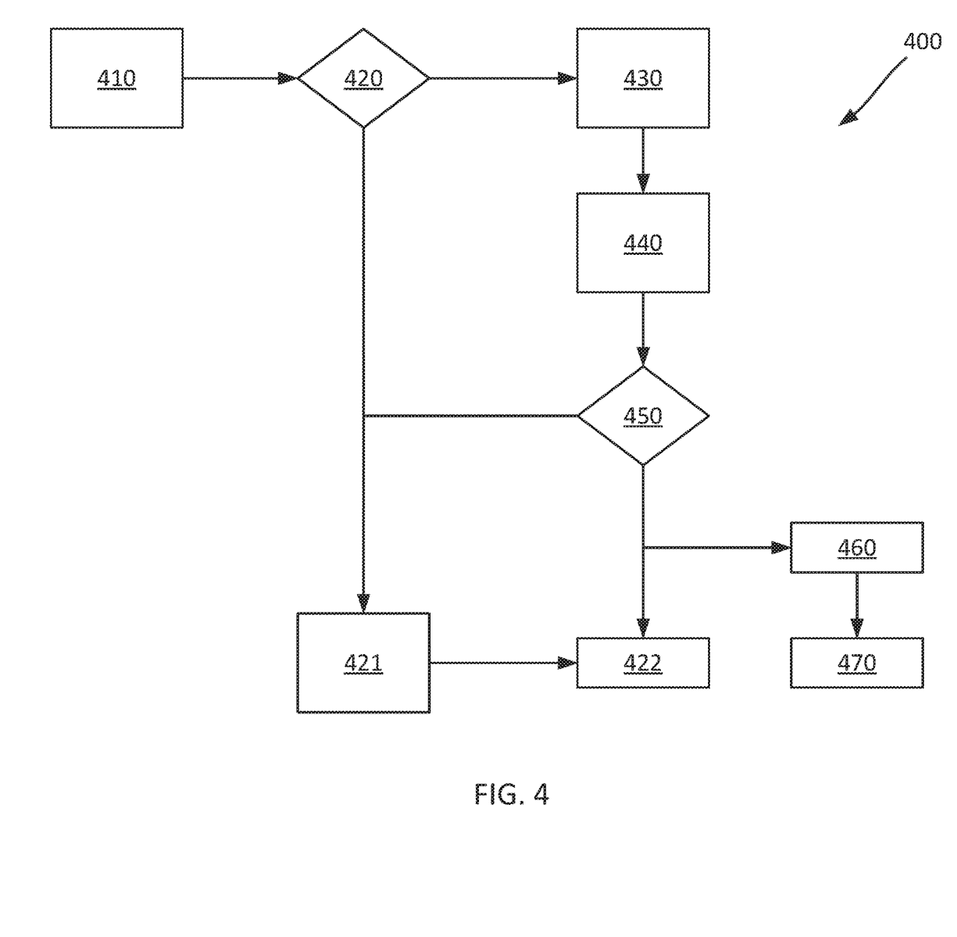
FIG. 4 illustrates a flowchart of a process for authorizing a privileged command request, in accordance with various embodiments.

Referring to FIG. 4, a flowchart 400 of a process for executing a command is illustrated according to various embodiments. A user may submit a privileged command request (step 410). For example, the request may be to access data or make a change to data on a master server. The master server may determine whether the user is a member of a PRC group which is granted selective permissions (step 420). In various embodiments, a user may be a member of multiple PRC groups which each have a unique set of permissions. If the user is not a member of any PRC group, the request may be rejected (step 425), and the attempt may be logged in a request log file (step 422).

If the user is a member of a PRC group, a database query may be executed (step 430). The master server may query the SQL database. The database query may comprise the user ID, the server on which the command is to be executed, and the PRC group of which the user is a member. The permissions for the specific PRC group and master server may be returned to the master server (step 440). By providing the master server with only the permissions relevant to the particular user, the master server may determine whether the user has access to execute the command by reviewing only a few lines of code, as opposed to reviewing the entire policy. This determination is often made in less than one second. In contrast, systems which review the entire policy may take many seconds or minutes to determine if the request is authorized. The master server may determine, based on the permissions, whether the requested command is authorized (450). For example, the master server may determine whether the user is a member of a PRC group, whether the PRC group has access to the master server, and whether the PRC group has permission to execute the requested command. If the requested command is not authorized based on any of these determinations, the command request may be rejected (step 421) and logged in the request log file (step 422). If the requested command is authorized, the requested command may be executed (step 460), and the requested command may be logged in the request log file (step 422) and the session may be logged in a session log file (step 470). The request log file and the session log file may be audited to show all requested commands that were requested or executed.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant aft(s) how to implement the disclosure in alternative embodiments.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE®TV®, PANDORA®, XBOX®, SONY® PLAYSTATION®), a uniform resource locator ("URL"), a document (e.g., a MICROSOFT® Word® document, a MICROSOFT® Excel® document, an ADOBE® .pdf document, etc.), an "ebook," an "emagazine," an application or microapplication (as described herein), an SMS or other type of text message, an email, Facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

In various embodiments, the methods described herein are implemented using the various particular machines described herein. The methods described herein may be implemented. using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS® NT®, WINDOWS® 95/98/2000®, WINDOWS® XP®, WINDOWS® Vista®, WINDOWS® 7®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEB SPHERE, WEB LOGIC, MOSS). In various embodiments, the server may include web servers e.g. APACHE, IIS, GWS, SUN JAVA® SYSTEM WEB SERVER).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MACBOOKS®, kiosks, terminals, point of sale (POS) devices and/or terminals, televisions, or any other device capable of receiving data over a network. A web-client may run MICROSOFT® INTERNET EXPLORER®, MOZILLA® FIREFOX®, GOOGLE®, CHROME®, APPLE®, Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., WINDOWS® NT®, 95/98/2000/CE/Mobile, OS2, UNIX®, LINUX®, SOLARIS®, MacOS, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, components, modules, and/or engines of system 100 may be implemented as microapplications or micro-apps. Micro-apps are typically deployed in the context of a mobile operating system, including for example, a WINDOWS® mobile operating system, an ANDROID® Operating System, APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein an "identifier" may be any suitable identifier that uniquely identifies an item. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16 bit integers.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE®, BLACKBERRY®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, APPLE®talk, IP-6, NetBIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA® 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned, and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Common database products that may be used to implement the databases include DB2 by IBM® (Armonk, N.Y.), various database products available from ORACLE® Corporation (Redwood Shores, Calif.), MICROSOFT® Access® or MICROSOFT® SQL Server® by MICROSOFT® Corporation (Redmond, Wash.), My SQL by My SQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The system may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within an web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® NT web server software, a MICROSOFT® SQL Server database system, and a MICROSOFT® Commerce Server. Additionally, components such as Access or MICROSOFT® SQL Server, ORACLE®, Sybase, Informix My SQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® Applets, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WEBSPHERE MQ™ (formerly MQSeries) by IBM®, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT, VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

Each participant is equipped with a computing device in order to interact with the system and facilitate online commerce transactions. The customer has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

Phrases and terms similar to an "entity" may include any individual, consumer, customer, group, business, organization, government entity, transaction account issuer or processor (e.g., credit, charge, etc.), merchant, consortium of merchants, account holder, charitable organization, software, hardware, and/or any other type of entity.

The system may include or interface with any of the foregoing accounts, devices, and/or a transponder and reader (e.g. RFID reader) in RF communication with the transponder (which may include a fob), or communications between an initiator and a target enabled by near field communications (NFC). Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart card"); a fob having a transponder and an RFID reader; and/or near field communication (NFC) technologies. For more information regarding NFC, refer to the following specifications all of which are incorporated by reference herein: ISO/IEC 18092/ECMA-340, Near Field Communication interface and Protocol-1 (NFCIP-1); ISO/IEC 21481/ECMA-352, Near Field Communication Interface and Protocol-2 (NFCIP-2); and EMV 4.2 available at http://www.emvco.com/default.aspx.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

The process flows and screenshots depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and user interface elements depicted in FIGS. 2-5, but also to the various system components as described above with reference to FIG. 1.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
creating, by a processor, a policy table on a master database server, the policy table comprising permissions for a plurality of users, wherein the permissions include a plurality of active permissions and a plurality of non-active permissions;
replicating, by the processor, only the plurality of active permissions in the policy table from the master database server to a plurality of structured query language (SQL) databases on a periodic basis to create a subset of the policy table,
wherein the replicating comprises overwriting a most current subset of the policy table on the plurality of SQL databases, and
wherein each of the plurality of SQL databases stores the plurality of active permissions received from the master database server, and each of the plurality of active permissions received comprises a permission expiration time;
dynamically removing, by the processor and in response to the overwriting, at least a subset of the plurality of active permissions from the plurality of SQL databases, in response to permission expiration time of the subset of the plurality of active permissions is reached;
receiving, by the processor, a request from a user of the plurality of users to execute a command at a particular server, wherein the request includes at least two of: an identification of the particular server, an identification of the command and a reason for the request;
in response to the receiving the request from the user, querying, by the processor, a SQL database in the plurality of SQL databases to review the plurality of active permissions in the subset of the policy table;
verifying, by the processor, that the request from the user has a permission that corresponds to one of the plurality of active permissions in the subset of the policy table on the SQL database; and
allowing, by the processor, the user to execute the command at the particular server, in response to positive verification of the request from the user.

2. The method of claim 1, further comprising receiving, by the processor, a policy change request.

3. The method of claim 2, further comprising approving, by the processor, the policy change request through an approval chain.

4. The method of claim 3, further comprising storing, by the processor, the policy change request in a policy change log.

5. The method of claim 4, wherein an active permission of the plurality of active permissions comprises an active start time and an active end time.

6. The method of claim 5, further comprising:
determining, by the processor, that the user is a member of a group;
determining, by the processor, that the group has the an active permission on the master database server;
determining, by the processor, that the group is authorized to execute the request;
executing, by the processor, the request;
logging, by the processor, the request in a request log file; and
logging, by the processor, the request in a session log file.

7. The method of claim 1, wherein the replicating is without replicating the plurality of non-active permissions.

8. An article of manufacture including a non-transitory, tangible computer readable storage medium having instructions stored thereon that, in response to execution by a processor, cause the processor to perform operations comprising:
creating, by the processor, a policy table on a master database server, the policy table comprising permissions for a plurality of users, wherein the permissions include a plurality of active permissions and a plurality of non-active permissions;
replicating, by the processor, only the plurality of active permissions in the policy table from the master database server to a plurality of structured query language (SQL) databases on a periodic basis to create a subset of the policy table,
wherein the replicating comprises overwriting a most current subset of the policy table on the plurality of SQL databases, and
wherein each of the plurality of SQL databases stores the plurality of active permissions received from the master database server, and each of the plurality of active permissions received comprises a permission expiration time;
dynamically removing, by the processor and in response to the overwriting, at least a subset of the plurality of active permissions from the plurality of SQL databases, in response to permission expiration time of the subset of the plurality of active permissions is reached;
receiving, by the processor, a request from a user of the plurality of users to execute a command at a particular server, wherein the request includes at least two of: an identification of the particular server, an identification of the command and a reason for the request;
in response to the receiving the request from the user, querying, by the processor, a SQL database in the plurality of SQL databases to review the plurality of active permissions in the subset of the policy table;
verifying, by the processor, that the request from the user has a permission that corresponds to one of the plurality of active permissions in the subset of the policy table on the SQL database; and
allowing, by the processor, the user to execute the command at the particular server, in response to positive verification of the request from the user.

9. The method of claim 6, wherein the plurality of SQL databases are in a clustered SQL environment in communication with the master database server such that the clustered SQL environment is used to make changes to the policy table on the master database server.

10. The method of claim 9, wherein the replicating includes a one-way replication such that the master database server and the policy table are not impacted by changes to one of the plurality of SQL databases.

11. The method of claim 10, wherein a change to a policy in the subset of the policy table in one of the plurality of SQL databases is effective only upon the replicating.

12. The method of claim 11, wherein the replicating results in the subset of the policy table in the one of the plurality of SQL databases including less than a complete policy.

13. The method of claim 12, wherein in response to a failure of the master database server, the subset of the policy table remains active until the master database server is operating again to allow the replicating.

14. The method of claim 13, wherein the policy table includes a group table comprising a group, owner information, environment, role description, role family, group description, and entitlements.

15. A system comprising:
- a processor; and
- a tangible, non-transitory memory configured to communicate with the processor,
- the tangible, non-transitory memory having instructions stored thereon that, in response to execution by the processor, cause the processor to perform operations comprising:
- creating, by the processor, a policy table on a master database server, the policy table comprising permissions for a plurality of users, wherein the permissions include a plurality of active permissions and a plurality of non-active permissions;
- replicating, by the processor, only the plurality of active permissions in the policy table from the master database server to a plurality of structured query language (SQL) databases on a periodic basis to create a subset of the policy table,
- wherein the replicating comprises overwriting a most current subset of the policy table on the plurality of SQL databases, and
- wherein each of the plurality of SQL databases stores the plurality of active permissions received from the master database server, and each of the plurality of active permissions received comprises a permission expiration time;
- dynamically removing, by the processor and in response to the overwriting, at least a subset of the plurality of active permissions from the plurality of SQL databases, in response to permission expiration time of the subset of the plurality of active permissions is reached;
- receiving, by the processor, a request from a user of the plurality of users to execute a command at a particular server, wherein the request includes at least two of: an identification of the particular server, an identification of the command and a reason for the request;
- in response to the receiving the request from the user, querying, by the processor, a SQL database in the plurality of SQL databases to review the plurality of active permissions in the subset of the policy table;
- verifying, by the processor, that the request from the user has a permission that corresponds to one of the plurality of active permissions in the subset of the policy table on the SQL database; and
- allowing, by the processor, the user to execute the command at the particular server, in response to positive verification of the request from the user.

16. The system of claim 15, wherein the operations further comprise receiving, by the processor, a policy change request.

17. The system of claim 16, wherein the operations further comprise approving, by the processor, the policy change request through an approval chain.

18. The system of claim 16, wherein the operations further comprise storing, by the processor, the policy change request in a policy change log.

19. The system of claim 15, wherein an active permission of the plurality of active permissions comprises an active start time and an active end time.

* * * * *